US010286900B2

(12) United States Patent
Xi et al.

(10) Patent No.: US 10,286,900 B2
(45) Date of Patent: May 14, 2019

(54) INTELLIGENT DRIVING SYSTEM WITH AN EMBEDDED DRIVER MODEL

(71) Applicant: BEIJING INSTITUTE OF TECHNOLOGY, Beijing (CN)

(72) Inventors: Junqiang Xi, Beijing (CN); Wenshuo Wang, Beijing (CN)

(73) Assignee: BEIJING INSTITUTE OF TECHNOLOGY (CN)

( * ) Notice: Subject to any disclaimer, the term of this patent is extended or adjusted under 35 U.S.C. 154(b) by 156 days.

(21) Appl. No.: 15/512,987

(22) PCT Filed: Apr. 15, 2015

(86) PCT No.: PCT/CN2015/076612
§ 371 (c)(1),
(2) Date: Mar. 21, 2017

(87) PCT Pub. No.: WO2016/045365
PCT Pub. Date: Mar. 31, 2016

(65) Prior Publication Data
US 2017/0297564 A1 Oct. 19, 2017

(30) Foreign Application Priority Data

Sep. 23, 2014 (CN) .......................... 2014 1 0487956

(51) Int. Cl.
*B60W 30/02* (2012.01)
*G06N 20/00* (2019.01)
(Continued)

(52) U.S. Cl.
CPC .... *B60W 30/025* (2013.01); *B60W 30/18145* (2013.01); *B60W 50/0098* (2013.01);
(Continued)

(58) Field of Classification Search
CPC ................ B60W 30/02; B60W 50/00; B60W 2050/0089; B60W 2520/06;
(Continued)

(56) References Cited

U.S. PATENT DOCUMENTS 8,280,623 B2 * 10/2012 Trepagnier ............ G01S 17/023
701/301
8,886,387 B1 * 11/2014 Agarwal .............. G05D 1/0253
701/28
(Continued)

FOREIGN PATENT DOCUMENTS

CN 1915725 A 2/2007
CN 10271785 A 10/2012
(Continued)

OTHER PUBLICATIONS

Song et al., Cognitive and hybrid model of human driver, 2000, IEEE, p. 1-6 (Year: 2000).*
(Continued)

*Primary Examiner* — McDieunel Marc
(74) *Attorney, Agent, or Firm* — Calfee, Halter & Griswold LLP

(57) ABSTRACT

An intelligent driving system with an embedded driver model. The system includes a driver model module that adjusts vehicle performances according to driving characteristics of a driver and road environment. A driver's visual and tactile information may be taken into account when driving a vehicle, so as to tune vehicle performances to allow the vehicle to adapt itself to the individual driver.

9 Claims, 3 Drawing Sheets

(51) Int. Cl.
*B60W 50/00* (2006.01)
*G05D 1/00* (2006.01)
*B60W 30/18* (2012.01)

(52) U.S. Cl.
CPC .......... *G05D 1/0088* (2013.01); *G06N 20/00* (2019.01); *B60W 2050/0029* (2013.01); *B60W 2050/0083* (2013.01); *B60W 2050/0089* (2013.01); *B60W 2420/42* (2013.01); *B60W 2520/06* (2013.01); *B60W 2520/10* (2013.01); *B60W 2540/30* (2013.01); *B60W 2550/142* (2013.01); *B60W 2550/146* (2013.01); *B60W 2550/148* (2013.01); *B60W 2550/20* (2013.01); *B60W 2710/226* (2013.01); *B60W 2720/10* (2013.01); *B60W 2720/106* (2013.01); *B60W 2720/14* (2013.01)

(58) Field of Classification Search
CPC ....... B60W 2520/10; B60W 2710/226; B60W 2540/30; B60W 30/18145; B60W 50/0098; B60W 2050/0083; B60W 2250/142; B60W 2250/146; B60W 2250/148; B60W 2250/20; B60W 2720/106; B60W 2720/14; B60W 2420/42; G05D 1/00; G05D 1/0088; G06N 99/00; G06N 20/00
See application file for complete search history.

(56) References Cited

U.S. PATENT DOCUMENTS

| | | | | |
|---|---|---|---|---|
| 9,274,525 | B1* | 3/2016 | Ferguson | G05D 1/0274 |
| 10,002,470 | B2* | 6/2018 | Prakah-Asante | G07C 5/08 |
| 2013/0054050 | A1* | 2/2013 | Filev | B60W 50/0097 |
| | | | | 701/2 |
| 2013/0096731 | A1* | 4/2013 | Tamari | G06F 11/3013 |
| | | | | 701/1 |
| 2014/0148972 | A1* | 5/2014 | Basir | G07C 5/008 |
| | | | | 701/1 |
| 2014/0176714 | A1* | 6/2014 | Li | G08G 1/166 |
| | | | | 348/148 |
| 2014/0309864 | A1* | 10/2014 | Ricci | H04W 4/21 |
| | | | | 701/36 |
| 2015/0166072 | A1* | 6/2015 | Powers | B60W 40/06 |
| | | | | 701/1 |
| 2015/0307106 | A1* | 10/2015 | Rao | B60W 40/09 |
| | | | | 701/29.1 |

FOREIGN PATENT DOCUMENTS

| | | |
|---|---|---|
| CN | 102795225 A | 11/2012 |
| CN | 102934150 A | 2/2013 |
| CN | 103640622 A | 3/2014 |
| CN | 104260725 A | 1/2015 |
| JP | 2008120172 A | 5/2008 |

OTHER PUBLICATIONS

Kamal et al., Comprehensive driving behavior model for intelligent transportation systems, 2008, IEEE, p. 1233-1236 (Year: 2008).*

Huang et al., Research on Autonomous Driving Control Method of Intelligent Vehicle Based on Vision Navigation, 2010, IEEE, p. 1-7 (Year: 2010).*

Wu et al., The Automated Lane-keeping Design for an Intelligent Vehicle, 2005, IEEE, p. 508-513 (Year: 2006).*

Liu et al. Towards Real-Time Recognition of Driver Intentions, 1998, IEEE, p. 236-241 (Year: 1998).*

Bertozzi et al., Artificial vision in road vehicles, 2002, IEEE, p. 1258-1271 (Year: 2002).*

Xu et al., Smart car care systems and its technology prospects with service robots function, 2014, IEEE, p. 1289-1294 (Year: 2014).*

Peng et al., Design and implementation of virtual driving system fusing driver's cognitive and operating characteristics, 2014, IEEE, p. 1826-1829 (Year: 2014).*

Shim et al., An Autonomous Driving System for Unknown Environments Using a Unified Map, 2015, IEEE, p. 1999-2013 (Year: 2015).*

* cited by examiner

# INTELLIGENT DRIVING SYSTEM WITH AN EMBEDDED DRIVER MODEL

CROSS REFERENCE

This application claims priority to Chinese Patent Application No. 201410487956.9, filed on Sep. 23, 2014, and International Patent Application No. PCT/CN2015/076612, filed on Apr. 15, 2015, both of which are hereby incorporated by reference in their entireties.

TECHNICAL FIELD

The present application relates to the field of automobiles, in particular to an intelligent driving system with an embedded driver model, a vehicle and a driving method of vehicle.

BACKGROUND

With the fast development of automotive electronic technology, various driver assistance systems have been widely applied to automobile control, such as Anti-lock Braking System (ABS), Electric Power Steering (EPS), Traction Control System (TCS), etc. However, the setting parameters of most automotive electronic control systems are generally fixed and the design of the automotive electronic control systems is normally based on automobile dynamics, so that the effect of drivers is ignored when designing a vehicle. Therefore, most vehicle systems cannot detect the operation intention and driving demands of the drivers, and the individual driver's driving preference (such as power performance, comfortableness and safety) cannot be satisfied.

For example, when a driver drives on a curve road, different drivers have different requirements on vehicle performance when passing through the curve road with the changing road radius. Specifically, some drivers prefer the vehicle driving performance when driving through the curve road, thus the tire-road force needs to be increased, that is, the suspension damping should be increased to improve the vehicle maneuverability and driving performance; and some drivers prefer the vehicle comfortableness when driving through the curve road, thus the value of suspension damping parameter of the vehicle should be reduced to improve the vehicle comfortableness.

Though the current suspension control systems (including active suspensions and semi-active suspensions) could have a good performance to the complex road surface and provide the comfortableness and driving performance of the vehicle, but the performance of the suspension system of the vehicle cannot be changed according to individual driver's driving demands. Therefore, the different demands of suspension systems for different drivers are ignored (For example, under the same road conditions, young drivers prefer driving performance, namely, a greater value of suspension damping parameter; and elderly drivers prefer comfortableness, namely, a smaller value of suspension damping parameter).

SUMMARY

Based on the above problems, the present application aims to provide an intelligent driving system with an embedded driver model, which can tune the vehicle performances according to different driving preferences of drivers.

According to one aspect of the present application, an intelligent driving system with an embedded driver model is provided, and the system includes a driver model module. The driver model module tunes the performance of the vehicle according to driver's driving characteristics and a road environment information. The driver's driving characteristics comprise the driver's driving preference (such as preference for comfortableness or power performance of the vehicle, and car-following or lane-changing preference), and the road environment information comprises visual information related to the driver's operations on the vehicle, such as the road surface adhesion coefficient, the width and curvature of the road, the gradient of the road and the traffic flow of the road.

According to another aspect of the present application, an intelligent driving system with an embedded driver model is provided, and the system includes: a road environment detection module, a driver operation detection module, a complete vehicle system module and a driver model module. The road environment detection module is used for detecting road environment information that includes visual information related to driver's operations on the vehicle, such as the road surface adhesion coefficient, the width and radius of the road, the gradient of the road and the traffic flow of the road. The driver operation detection module is used for detecting driver operation data which include tactile information related to the driver's operations on the vehicle, such as the feedback torque of a steering wheel, and operations on a brake/accelerator pedal, a clutch and a transmission. The complete vehicle system module is used for outputting vehicle state parameters. The driver model module is used for 1) collecting the road environment information, the driver operation data, the vehicle state parameters detected by the road environment detection module, the driver operation detection module and the complete vehicle system module, respectively, 2) analyzing the road environment information and the vehicle state parameters to obtain an expected parameter value required for driving, 3) analyzing the driver operation data to obtain driving characteristics of the driver, 4) comparing the expected parameter value with the driver's driving characteristics to obtain the driver's demands for the vehicle performance, and 5) tuning corresponding parameters of the vehicle according to the driver's demands.

According to a further aspect of the present application, the vehicle that includes the aforementioned intelligent driving system is provided.

According to a further aspect of the present application, a vehicle driving method that adopts the aforementioned intelligent driving system when driving a vehicle is provided.

By applying the system and method provided in the present application, the "road sense" (visual and tactile information) of the driver can be taken into account when driving by establishing the driver model, and the operation intentions and driving demands of the driver can be identified and predicted by the driver model. And then, the corresponding parameters of an electronic control system can be reasonably tuned in real time based on the identification and prediction results, allowing to make the vehicle performance satisfy the individual demands and safety demands and to make a seamless cooperation between driver and vehicle. Therefore, it can fulfill the control purpose that the vehicle adapts to driver by tuning the vehicle performance based on driver's characteristics.

DETAILED DESCRIPTION OF THE EMBODIMENTS

Figure 1:
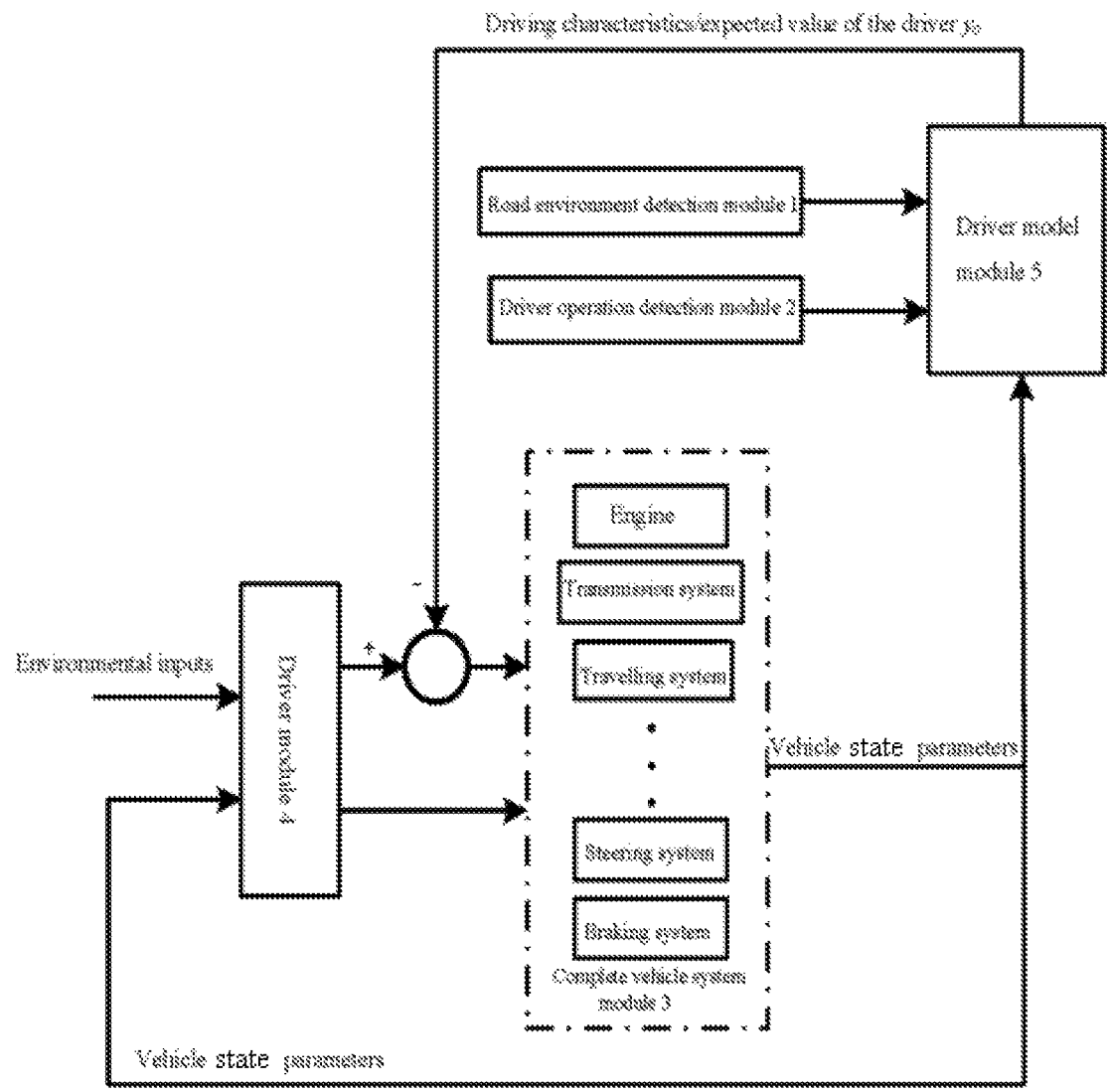
FIG. 1 is a schematic diagram of an intelligent driving system with an embedded driver model according to one embodiment of the present application.

For a better description of the present application, the detailed description will be further set forth with reference to the accompanying figures. But the following detailed description is merely an example of the preferred technical scheme of the present application, which should not be understood as the limitation of the protection scope of the present application.

To overcome the deficiency of existing vehicle control systems, i.e., the existing vehicle control systems that cannot adapt to the individualities or demands of drivers, the present application provides an intelligent driving system with two features of "identification and prediction" and "self-adaptation". This intelligent driving system not only has the ability of identifying the driving characteristics of the driver, but also has the ability of self-adaptation. Therefore, it can predict the driving intention and meet the individual driver's needs, and reduce driver workload and the driver's fatigue to improve the driving safety and comfortableness of the driver and reduce the occurrence of traffic accident.

In one embodiment, the intelligent driving system according to the present application comprises a driver model module, and the driver model module can tune the vehicle performance according to the information on driver's driving characteristics and a road environment information. In particular, the driver's driving characteristics includes the driver's driving preferences that can be influenced by lot of factors such as age, drunken situation, physical fatigue degree, response speed, etc. The road environment information includes visual information, such as the attachment coefficient of the road surface, the width and curvature of the road, the gradient of the road, and the traffic flow of the road.

In another embodiment, the intelligent driving system according to the present application comprises a road environment detection module, a driver operation detection module, a complete vehicle system module and a driver model module. Specifically, the road environment detection module is used for detecting the road environment information. The road environment detection module may comprise a distances-measuring radar and a camera, and the road environment information comprises the visual information related to the driver's operations on the vehicle. The driver operation detection module is used for detecting the driver operation data, which are involved in the tactile information related to the driver operations on the vehicle, such as operation parameter data of the steering wheel, the brake pedal, the accelerator pedal, the clutch and the transmission. The complete vehicle system module is used for outputting the state parameters of vehicle, such as vehicle speed, longitudinal acceleration and yaw velocity, etc. The driver model module is used for 1) collecting the road environment information detected by the road environment detection module, the driver operation data detected by the driver operation detection module and the vehicle state parameters output by the complete vehicle system module, 2) analyzing the road environment information as well as the vehicle state parameters to obtain an expected parameter value necessary for driving, 3) analyzing the operation data of the driver to obtain the driving characteristics of the driver, 4) comparing the expected parameter value with the driving characteristics of the driver to obtain demands of the driver for the vehicle performance, and 5) tuning corresponding parameters of the vehicle according to the demands. Furthermore, the system comprises a driver module which is used for tuning corresponding parameters of the vehicle according to the operation of the driver to fulfil driver's needs.

In addition, the vehicle according to the present application comprises the above-mentioned intelligent driving system with an embedded driver model. The driving method of the vehicle according to the present application also adopts the above-mentioned intelligent driving system.

In the following specific embodiments, the intelligent driving system containing a driver model according to the present application has been described in details.

Embodiment I

As shown in FIG. 1, an intelligent driving system with an embedded driver model, comprises a road environment detection module 1, a driver operation detection module 2, a complete vehicle system module 3, a driver module 4 and a driver model module 5.

Specifically, the road environment detection module 1 is used for collecting road environment information in real time and outputting the related data, wherein the road environment information includes the visual information, such as road surface attachment coefficient, road curvature, road width, gradient of the road and traffic flow of the road, etc. Thus, the road environment detection module 1 can output the road surface attachment coefficient parameters, the curvature parameters, the width parameters, the gradient parameters, the traffic density parameters of road related to the road surface attachment coefficient, the curvature, the width, the gradient, and the traffic flow of the road, respectively.

In general, the road environment detection module 1 may comprise distances-measuring radars and a camera, through both of which those skilled in the art may collect road environment information around a vehicle. The distances-measuring radars are preferably millimeter wave distances-measuring radars and the camera is preferably a high-resolution camera. A few of millimeter wave distances-measuring radars can be mounted on the front side as well as left and right sides of the vehicle, respectively. The high-resolution camera may be mounted on the top of the vehicle. The road environment information collected by the road environment detection module 1 is input into the driver model module 5. In addition, depending on actual needs, those skilled in the art may also mount the distances-measuring radar or the camera on the rear of the vehicle to collect road environment information behind the vehicle.

Further, the road environment detection module 1 may also comprises a weather collector for collecting parameters of specific weathers such as rain, snow. Optionally, the road environment detection module 1 may also comprise a temperature sensor. The collection process described above may be realized in an intelligent way, and may also be carried out in a manner of manual input.

Drivers usually drive in accordance with environmental changes, so collecting the road environment information around a vehicle becomes an important step in realizing an intelligent driving system, so that targeted optimization of the driving process is achieved based on the road environment information obtained by sensing road environment.

Figure 2A:
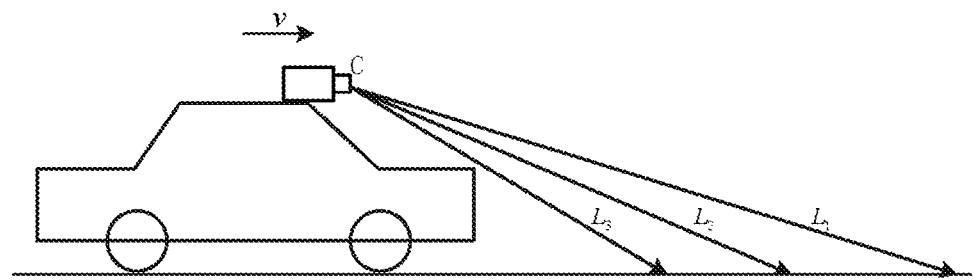
FIG. 2a and FIG. 2b are schematic diagrams of installation of road environment detection equipment according to the present application.
Figure 2B:
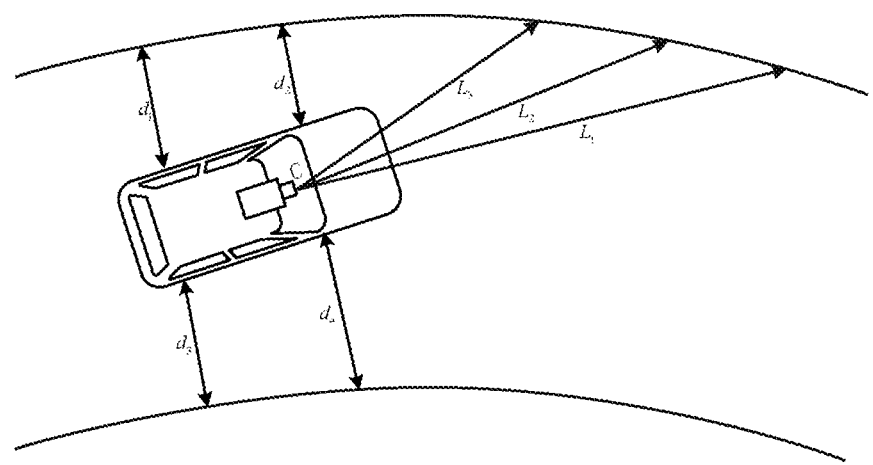

An example of a vehicle entering a curve road is given here. Typically, younger drivers tend to focus on driving performance, whereas elderly drivers tend to focus on driving comfortableness. That is to say, different drivers have different demands for the manipulation of a vehicle passing through a curve road. Therefore, the first step to meet the demands of different drivers is to judge whether the vehicle has entered the curve road. In this curve road, as shown in FIG. 2a and FIG. 2b, the vehicle speed is v, and the relative position between the vehicle and the road is determined by detecting the distances $d_1$, $d_2$, $d_3$ and $d_4$ between the vehicle and the two sides of the road via the radar mounted at the both sides of the vehicle. Through the camera C mounted on the top end of the vehicle, the distances $L_1$, $L_2$ and $L_3$ between road points ahead where the road is cut off and the camera are detected, and then a radius of curvature $\rho(t)$ of the road ahead is calculated. Further, whether the vehicle is about to enter a curve road or not is judged by detecting the road curvature radius $\rho(t)$ at the current time t, i.e., judging $\rho(t)=\infty$ or not. If $\rho(t)=\infty$, then it means that the vehicle is driven in a straight road, and detects the curvature radius of the road $\rho(t+\Delta t)$ at a time $t+\Delta t$. If $\rho(t)\neq\infty$, i.e., $\rho(t)<\infty$, then it means that the vehicle is about to travel or is traveling in the curve road.

The driver operation detection module 2 plays a primary role in detecting driver operation data, which are involved in tactile information, e.g. operation parameter data of the steering wheel, brake/accelerator pedals, clutch and transmission, etc.

The influence of the road factors on the driver can be obtained by integrating the driver's visual information and tactile information, i.e., the "road sense" of the driver. However, in the existing driver models, most driver models employ the road curvature as an input, while the factor of the driver's operation has been ignored, which has greater limitation for accurately acquiring the road conditions, such as the smooth road surface, road surface with significant heaves, that have different influences on the driver. Variation of these factors will also cause variation of the driving operation.

The driver operation detection module 2 in the embodiment of the present application comprises a steering wheel angle sensor, a steering wheel torque sensor, a steering wheel grip sensor, a brake pedal displacement sensor, an accelerator pedal displacement sensor and a gear shifting force sensor. These sensors detect the corresponding tactile information of the driver and feedback the collected tactile information to the driver model module 5.

The complete vehicle system module 3 is used for responding the driver's operation (such as gearshift, brake/accelerate, steering, etc.) to control the motion of the vehicle, and outputting the vehicle movement parameters (such as the vehicle speed, longitudinal acceleration, yaw velocity) to the driver model module 5.

The complete vehicle system comprises an engine, a transmission system, a driving system, a steering system, braking system and various sensors, and the sensors in the complete vehicle system mainly comprise a vehicle speed sensor, a yaw velocity sensor, a longitudinal and lateral acceleration sensor.

The driver module 4 is directly operated by the driver to control the vehicle. The driver model 4 comprises a steering wheel, a brake pedal, an accelerator pedal, a clutch, a transmission, etc.

The driver model module 5 collects the data output from the road environment detection module 1, the driver operation detection module 2 and the complete vehicle system module 3, identifies and predicts the above-mentioned data to obtain the driver's driving intention and driving characteristics, and outputs the expected parameter value or the driving characteristics to provide supports for tuning the vehicle parameters.

Take regulating the suspension performance according to driver's requirements when negotiating the curve road as an example. At the time t, the road curvature radius $\rho$ is obtained through the road environment detection module 1; the driver operation detection module 2 detects the steering wheel angle, i.e., the actual steering wheel angle $\delta_s$ that the driver applies to the steering wheel; the complete vehicle system module 3 detects the longitudinal velocity $v_x$ of the vehicle; and the expected steering wheel angle $\delta_{sr}$ is calculated by the driver model module 5, i.e., the expected steering wheel angle, wherein $$\delta_{sr} = i_s \frac{L(1-Kv_x^2)}{\rho}$$

wherein L is a wheelbase, $i_s$ is a steering ratio, K is a vehicle stability coefficient, $v_x$ is the longitudinal velocity of the vehicle and $\rho$ is the road curvature radius;

Meanwhile, the driver module 4 directly controls the vehicle by sensing the vehicle motion and driving environment.

Furthermore, the output parameters of the driver module 4 and the driver model module 5 are transferred to an Electronic Control Unit (ECU) for calculation, some of the parameters of the vehicle are adjusted based on the calculation result so as to control the vehicle performance.

Taking the scene where the vehicle is running on a curve road as an example, ECU compares the actual turning angle $\delta_s$ with the expected steering wheel angle $\delta_{sr}$, if $$\begin{cases} ||\delta_s|-|\delta_{sr}|| \geq \Delta\delta \\ |\delta_s| \geq |\delta_{sr}| \end{cases},$$

it indicates that the driver prefers a relatively high tire-road force and wants to pass the curve road quickly, at this time, the value of suspension damping parameter should be increased; if $$\begin{cases} ||\delta_s|-|\delta_{sr}|| \geq \Delta\delta \\ |\delta_s| < |\delta_{sr}| \end{cases},$$

it indicates that the driver prefers a relatively good comfortableness when passing the curve road, at this time, the value of suspension damping is reduced to meet the individual driver's demands; if $||\delta_g|-|\delta_{sr}||<\Delta\delta$, it indicates that the driver prefers both relatively good comfortableness and driving performance at the same time, and the value of suspension damping is set as a median value, wherein $\Delta\delta$ is a preset threshold value.

In addition, the vehicle performance expected by the driver can be identified in other scenes except for the scene where the vehicle is passing through the curve road in the embodiments of the present application, and the vehicle parameters can be tuned correspondingly according to the driver's preferences to make the vehicle satisfy the individual driving demands, thereby achieving the goal that the vehicle adapts to driver. All the data processing modules can be processed through ECU, and the frequency of the preferred data acquisition processing is 50 Hz.

The visual information and the tactile information of the driver have been considered comprehensively in the embodiments of the present application. The visual, tactile information and state parameters of the vehicle are used as input of the driver model that is combined with the vehicle control system. The input information (visual information, tactile information and vehicle state parameters etc.) is processed via the driver model for identifying and predicting the behavior of the driver, and then the vehicle control system parameters are tuned and modified in real time according to the driver's expected value output from the driver model, allowing to make the vehicle performance be changed with the driver characteristics and make the vehicle performance meet the driver's driving behavior characteristic more simultaneously, meeting the driver's driving demands, reducing the driver workload, and avoiding traffic accidents.

Embodiment II

Figure 3:
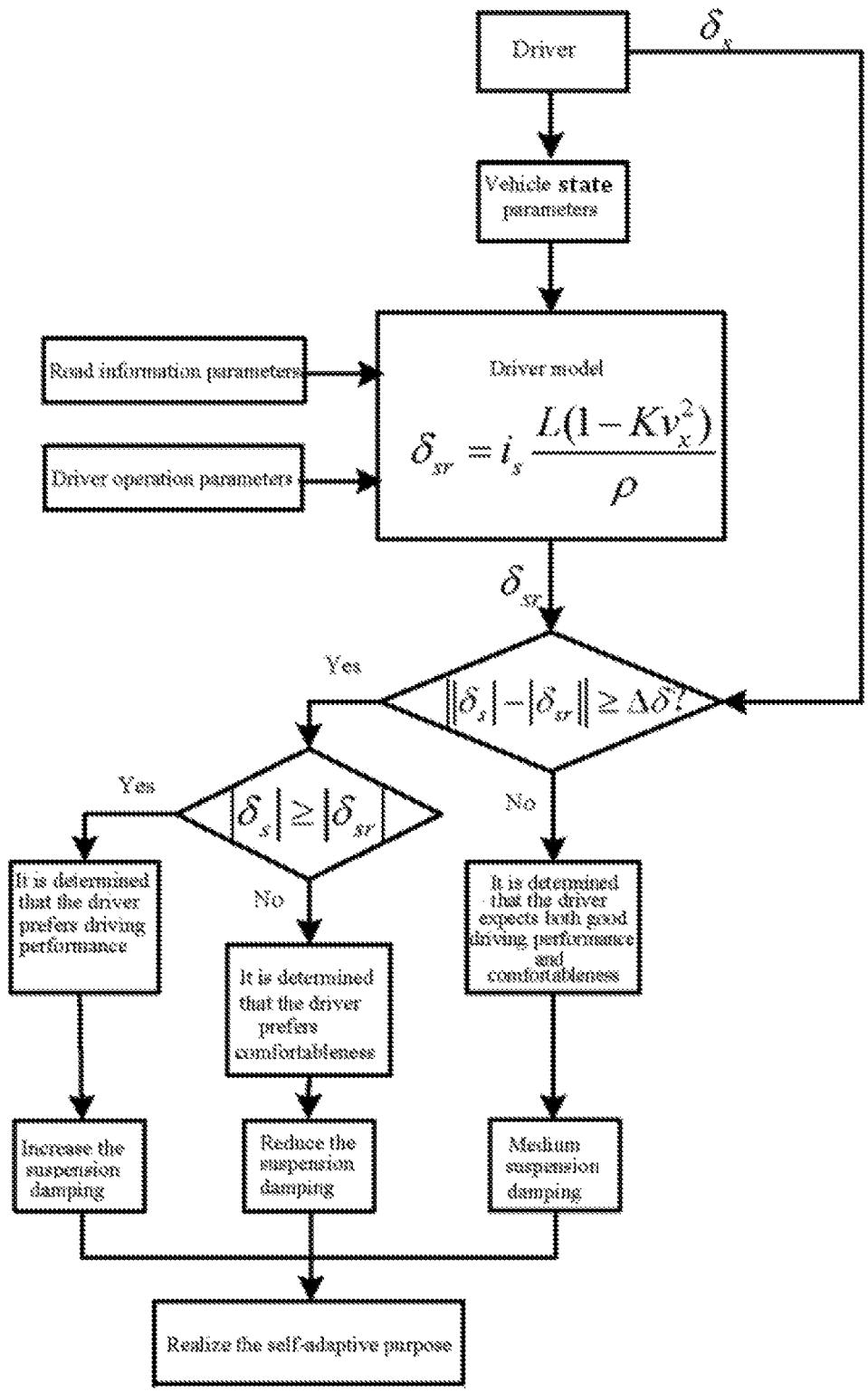
FIG. 3 is a control flowchart of an intelligent suspension system according to one embodiment of the present application.

As shown in FIG. 3, according to another aspect of the present application, a vehicle driving method which comprises the following steps:

1) automatically detecting a current state of the vehicle, a current state of the driver and a state of the road ahead before starting the vehicle;

2) detecting a road curvature radius $\rho(t)$ at the current time t, determining whether the vehicle is about to enter a curve road, i.e., determining $\rho(t)=\infty$ or not; if yes, it indicates that the vehicle is running along a straight lane and calculating a road radius curvature $\rho(t+\Delta t)$ at the current time $t+\Delta t$; if $\rho(t)<\infty$, it indicates that the vehicle is going to enter or has entered the curve road and calculating a road curvature radius $\rho(t+\Delta t)$ at the current time $t+\Delta t$:

3) detecting a steering wheel angle applied by the driver, i.e., the actual steering wheel angle $\delta_s$;

4) detecting a longitudinal velocity $v_x$ of the vehicle;

5) calculating an expected steering wheel angle $\delta_{sr}$ for passing the curve road, wherein $$\delta_{sr} = i_s \frac{L(1-Kv_x^2)}{\rho}$$

wherein L is a wheelbase, $i_s$ is a steering ratio, K is a vehicle stability coefficient, $v_x$ is the longitudinal velocity of the vehicle and $\rho$ is the road curvature radius;

6) comparing $\delta_s$ with $\delta_{sr}$ to adjust a suspension damping parameter of the vehicle. If $$\begin{cases} ||\delta_s|-|\delta_{sr}|| \geq \Delta\delta \\ |\delta_s| \geq |\delta_{sr}| \end{cases},$$

it indicates that the driver prefers a higher tire-road force and wants to pass the curve road quickly, at this time, the value of suspension damping parameter is increased; if $$\begin{cases} ||\delta_s|-|\delta_{sr}|| \geq \Delta\delta \\ |\delta_s| < |\delta_{sr}| \end{cases},$$

it indicates that the driver prefers a better comfortableness when passing the curve road, at this time, the value of suspension damping is reduced to meet the individual driver's demands; if $||\delta_s|-|\delta_{sr}||<\Delta\delta$, it indicates that the driver prefers both good comfortableness and driving performance at the same time, and the value of suspension damping is set as a median value, wherein $\Delta\delta$ is a preset threshold value.

In conclusion, this intelligent driver system comprises a driver model module for identifying and predicting the driving behaviors or preferences. The driver model comprehensively uses the visual and tactile information as the road sense information of the driver, such that it can identify and predict the behavior characteristic and driving demands of the driver. Based on the identification and prediction results, the vehicle control system parameters could be tuned and modified in real time allowing to make the vehicle performance meet the driving behavior characteristics and demands of the driver more simultaneously, reducing the driver's workload, and avoiding traffic accidents.

By applying the method in the embodiment of the present application, when driving a vehicle, the road sense (visual and tactile information) can be taken into account by establishing the driver model which can identify and predict the driver's intentions and demands. And then, the corresponding parameters of the vehicle control system can be tuned in real time based on the identification and prediction results, allowing to make the vehicle performance meet the individual driver's demands and safety demands, achieve the seamless cooperation between driver and vehicle. Therefore, the proposed intelligent driving system can reach the purpose of "the vehicle adapts to people" and enable the vehicle control system to have the ability to identification and self-adaption at the same time.

For different driver models, the driver's physiological characteristic parameters (age, drunken situation, physical fatigue degree, response speed, etc.) and psychological characteristic parameters (stress degree, emotion of the driver, etc.) can also be used as the input parameters of the driver model in the system. On the other hand, it can also be applied to real-time parameter adjusting of engine, clutch, transmission and brake system to realizing the purpose of "the vehicle adapts to people".

The described above is only the preferably specific embodiments of the present application, but the claimed scope of the present application is not limited thereto, variations or substitutions can be readily devised by those skilled in the art that will fall within the claimed scope of the present application. Therefore, the claimed scope of the present application should be defined by the claims.

What is claimed is:

1. An intelligent driving system with an embedded driver model, comprising: a road environment detection module, a driver operation detection module, a complete vehicle system module, and a driver model module;

wherein, the road environment detection module is used for detecting the road environment information that comprises visual information related to the driver's operations on the vehicle;

the driver operation detection module is used for detecting driver operation data that comprise tactile information related to the driver's operations on the vehicle;

the complete vehicle system module is used for outputting vehicle state parameters;

the driver model module is used for 1) collecting the road environment information detected by the road environment detection module, the driver operation data detected by the driver operation detection module, and the vehicle state parameters output by the complete vehicle system module, 2) analyzing the road environment information and the vehicle state parameters to obtain an expected parameter value required for driving, 3) analyzing the output data collected by the driver operation detection module to obtain the driving characteristics of the driver, 4) comparing the expected parameter value with the driving characteristics of the driver to obtain the driver's demands for the vehicle performance, and 5) tuning corresponding parameters of the vehicle according to the driver's demands.

2. The system according to claim 1, characterized by further comprising a driver module, wherein the driver module is used for changing a motion state of the vehicle according to the operation of the driver.

3. The system according to claim 1, characterized in that the road environment detection module comprises a distances-measuring radar and a camera; the road environment information comprises the visual information related to the driver's operations on the vehicle; and the visual information comprises a road curvature, a road width, an adhesion coefficient of road surface, and a traffic flow.

4. The system according to claim 1, characterized in that the tactile information comprises operation parameter data on a steering wheel, a brake pedal, an accelerator pedal, a clutch and a transmission.

5. The system according to claim 1, characterized in that the vehicle states parameters output by the complete vehicle system module comprise a vehicle speed, a longitudinal acceleration and a yaw velocity.

6. The system according to claim 1, characterized in that the road environment comprises curve road, at a certain time, a road curvature radius $\rho$, an actual steering wheel angle $\delta_s$ and a longitudinal velocity $v_x$ of the vehicle are detected by the road environment detection module, the driver operation detection module, and the complete vehicle system module, respectively, and an expected steering wheel angle $$\delta_{sr} = i_s \frac{L(1 - K v_x^2)}{\rho}$$

is calculated in the driver model module,
wherein L is a wheelbase, $i_s$ is a steering ratio, K is a vehicle stability coefficient, $v_x$ is the longitudinal velocity of the vehicle and $\rho$ is the road curvature radius;
the driver module compares the actual steering wheel angle $\delta_s$ with the expected steering wheel angle $\delta_{sr}$, if $$\begin{cases} ||\delta_s| - |\delta_{sr}|| \geq \Delta\delta \\ |\delta_s| \geq |\delta_{sr}| \end{cases},$$

it is determined that the driver prefers a relatively high tire-road force, and then the value of suspension damping parameter is increased; if $$\begin{cases} ||\delta_s| - |\delta_{sr}|| \geq \Delta\delta \\ |\delta_s| < |\delta_{sr}| \end{cases},$$

it indicates that the driver prefers a relatively good comfortableness when passing the curve road, and then the value of suspension damping parameter is reduced; if $||\delta_s| - |\delta_{sr}|| < \Delta\delta$, it indicates that the driver prefers both relatively good driving performance and comfortableness at the same time, and the suspension damping is tuned to a median value, wherein $\Delta\delta$ is a preset threshold value.

7. A vehicle, characterized in that the vehicle comprises the system according to claim 1.

8. A vehicle driving method, characterized in that the vehicle adopts the system according to claim 1.

9. The method according to claim 8, characterized in that the method further comprises the following steps:
1) automatically detecting current states of the vehicle, current states of the driver and states of the road ahead before starting the vehicle;
2) detecting a road curvature radius $\rho(t)$ at the current time t, determining whether the vehicle is about to enter a curve road, i.e., if $\rho(t) = \infty$, it indicates that the vehicle is running in a straight lane and calculating a road curvature radius $\rho(t+\Delta t)$ at a time $t+\Delta t$; if $\rho(t) < \infty$, it indicates that the vehicle is about to enter or has entered the curve road, and calculating a road radius curvature $\rho(t+\Delta t)$ at the time $t+\Delta t$;
3) detecting the actual steering wheel angle $\delta_s$ $\delta_s$ applied by the driver;
4) detecting a longitudinal velocity $v_x$ of the vehicle;
5) calculating an expected steering wheel angle $\delta_{sr}$ for passing the curve road, wherein $$\delta_{sr} = i_s \frac{L(1 - K v_x^2)}{\rho}$$

wherein L is a wheelbase, $i_s$ is a steering ratio, K is a vehicle stability coefficient, $v_x$ is the longitudinal velocity of the vehicle, and $\rho$ is the road curvature radius;
6) comparing $\delta_s$ with $\delta_{sr}$ to adjust a suspension damping parameter of the vehicle; if $$\begin{cases} ||\delta_s| - |\delta_{sr}|| \geq \Delta\delta \\ |\delta_s| \geq |\delta_{sr}| \end{cases},$$

it indicates that the driver prefers a relatively high tire-road force, and the value of suspension damping parameter is increased; if $$\begin{cases} ||\delta_s| - |\delta_{sr}|| \geq \Delta\delta \\ |\delta_s| < |\delta_{sr}| \end{cases},$$

it indicates that the driver prefers relatively good comfortableness when passing the curve roads, and the value of suspension damping is reduced; if $||\delta_s| - |\delta_{sr}|| < \Delta\delta$, it indicates that the driver prefers both relatively good driving performance and comfortableness at the same time, and the value of suspension damping is adjusted to a median value, wherein $\Delta\delta$ is a preset threshold value.

* * * * *